United States Patent
Hopf et al.

(10) Patent No.: US 11,454,202 B2
(45) Date of Patent: Sep. 27, 2022

(54) METHOD AND DEVICE FOR ASCERTAINING A CLOSURE POINT IN TIME OF AN INJECTOR OF AN INTERNAL COMBUSTION ENGINE WITH THE AID OF A MACHINE LEARNING SYSTEM

(71) Applicant: Robert Bosch GmbH, Stuttgart (DE)

(72) Inventors: Andreas Hopf, Stuttgart (DE); Erik Tonner, Mehring (DE); Frank Kowol, Knittlingen (DE); Jens-Holger Barth, Fellbach (DE); Konrad Groh, Stuttgart (DE); Matthias Woehrle, Bietigheim-Bissingen (DE); Mona Meister, Renningen (DE); Roland Norden, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/456,040

(22) Filed: Nov. 22, 2021

(65) Prior Publication Data
US 2022/0170436 A1   Jun. 2, 2022

(30) Foreign Application Priority Data
Nov. 27, 2020   (DE) .......................... 102020214952.6

(51) Int. Cl.
*F02M 65/00* (2006.01)
*G06N 3/08* (2006.01)

(52) U.S. Cl.
CPC ......... *F02M 65/00* (2013.01); *F02M 2200/24* (2013.01); *G06N 3/08* (2013.01)

(58) Field of Classification Search
CPC .. F02D 41/20; F02D 41/2096; F02D 2041/20; F02D 2041/2055; F02M 51/06;
(Continued)

(56) References Cited

U.S. PATENT DOCUMENTS

| 11,162,451 B1* | 11/2021 | Kiwan ................. F02D 41/401 |
| 2016/0090936 A1* | 3/2016 | Melis .................... F02D 41/402 |
| | | 123/478 |

FOREIGN PATENT DOCUMENTS

| DE | 10355412 B4 | 5/2006 |
| DE | 102008005524 A1 | 7/2009 |

(Continued)

*Primary Examiner* — John Kwon
*Assistant Examiner* — Johnny H Hoang
(74) *Attorney, Agent, or Firm* — Norton Rose Fulbright US LLP; Gerard Messina

(57) ABSTRACT

A computer-implemented method for ascertaining a closure point in time of an injector of an internal combustion engine using a classifier. The method includes: ascertaining a time series of input signals, each corresponding to a point in time within the time series, and each characterizing a deformation of the injector; ascertaining a plurality of first values using the classifier based on the time series, in each case a first value corresponding to a point in time of the time series, and the first value characterizing a probability that the closure point in time of the injector matches the point in time; ascertaining a plurality of second values, each being a sum of neighboring first values, of a first value and the first value, the second value corresponding to the point in time to which the first value corresponds; ascertaining the closure point in time based on the largest second value.

10 Claims, 3 Drawing Sheets

(58) Field of Classification Search
CPC .. F02M 51/0603; F02M 57/005; F02M 65/00; F02M 2200/23; F02M 2200/244
See application file for complete search history.

(56) References Cited

FOREIGN PATENT DOCUMENTS

| | | |
|---|---|---|
| DE | 102014219242 A1 | 3/2016 |
| DE | 102019209690 A1 | 3/2020 |

* cited by examiner

METHOD AND DEVICE FOR ASCERTAINING A CLOSURE POINT IN TIME OF AN INJECTOR OF AN INTERNAL COMBUSTION ENGINE WITH THE AID OF A MACHINE LEARNING SYSTEM

FIELD

The present invention relates to a method for ascertaining a closure point in time of an injector of an internal combustion engine, a control system, a training system, a computer program, and a machine-readable memory medium.

BACKGROUND INFORMATION

A method for determining a closure point in time of a fuel injector with the aid of a sensor device that includes a piezoelement is described in German Patent Application No. DE 10 2014 219 242 A1.

SUMMARY

Direct injection of fuels in internal combustion engines, for example diesel engines or gasoline engines with direct injection, allows advantageous operating properties of the internal combustion engine. One challenge is to control the combustion process as precisely as possible in order to improve operating properties of the internal combustion engine, in particular with regard to fuel consumption, efficiency, pollutant emissions, and running smoothness.

In this regard, it is important to operate the injectors (also referred to as injection nozzles or injection valves) of the internal combustion engine in such a way that the fuel quantity to be injected may be metered with a high level of reproducibility. The injectors may include an electromagnetic actuator or piezoactuator, for example, which may actuate a valve needle of the injector in order to lift the valve needle from a needle seat and open an outlet opening of the injector for discharging the fuel into a combustion chamber.

Due to structural differences, design tolerances, and/or different operating conditions such as temperature, fuel pressure, or fuel viscosity, there is uncertainty in determining the exact closure point in time of the injector, i.e., the point in time at which the needle of the injector closes and fuel no longer passes through the injector into the combustion chamber.

An advantage of a method having the features of an example embodiment of the present invention is that the closure time of an injector of an internal combustion engine may be determined more accurately. The quantity of fuel that has been delivered through the injector in an injection may thus advantageously be ascertained more accurately. This allows improved activation of the internal combustion engine, since the quantity of fuel may be metered more precisely. Operating properties of the internal combustion engine, in particular with regard to fuel consumption, efficiency, pollutant emissions, and running smoothness, may thus be advantageously improved.

The method yields its advantage by the use of a specialized classifier, with the aid of which the exact closure point in time of the injector may be classified very accurately.

In a first aspect, the present invention relates to a computer-implemented method for ascertaining a closure point in time of an injector of an internal combustion engine with the aid of a classifier. In accordance with an example embodiment of the present invention, the method includes the following steps:

ascertaining a time series of input signals, the input signals in each case corresponding to a point in time within the time series, and the input signals in each case characterizing a deformation of the injector;

ascertaining a plurality of first values with the aid of the classifier based on the time series of input signals, in each case a first value corresponding to a point in time of the time series, and the first value characterizing a probability that the closure point in time of the injector matches the point in time;

ascertaining a plurality of second values, a second value in each case being a sum of neighboring first values of a first value and the first value, the neighboring first values being ascertained based on the points in time corresponding to the first values, and the second value corresponding to the point in time to which the first value corresponds;

ascertaining the closure point in time based on the largest second value of the plurality of second values.

The method may be understood in such a way that the exact closure point in time of the injector may be ascertained based on the deformation of the injector. The inventors have found that this approach for ascertaining the closure point in time allows a very accurate ascertainment of the closure point in time.

The injector may in particular be an injector of a diesel engine or a gasoline engine with direct injection.

For ascertaining the time series, measurements may be carried out, preferably at periodic points in time, via a suitable sensor that may ascertain the deformation of the injector, it being possible to use the individual measurements in each case as input signals of the time series. In particular, a point in time, for example a time of day or a relative point in time of the input signal within the time series, may thus be associated with each input signal of the time series.

It is also possible to use a segment or a subset of some other time series as the time series.

In one advantageous specific embodiment of the present invention, it is possible for the input signals to be ascertained with the aid of a piezo sensor.

This is advantageous, since piezo sensors allow very accurate measurements with regard to deformation due to the fact that they are insensitive to electromagnetic radiation or electromagnetic fields and have a high natural frequency. The deformation of the injector may thus be determined very accurately, resulting in a more accurate determination of the closure point in time.

The time series is transferred to a classifier. The classifier may be understood in such a way that, for the points in time mapped by the time series, it determines in each case whether or not this is a closure point in time. Due to supplying the input signals of the time series, the classifier is advantageously provided with a context of measurements, on the basis of which it may ascertain for the particular points in time whether or not they are a closure point in time. The classifier ascertains the plurality of first values, based on the time series. A first value may be understood as corresponding to a point in time that is characterized by the time series. In particular, it is possible for a first value to be ascertained for each input signal of the time series, the first value characterizing a probability that the point in time at which the input signal has been ascertained by the sensor is a closure point in time.

The classifier may include a machine learning model on the basis of which the classifier may ascertain the first values. Alternatively or additionally, it is also possible for the first values to be ascertained based on a rule-based model of the classifier.

In one advantageous specific embodiment of the present invention, it is possible for the classifier to include a neural network, with the aid of which the plurality of first values is ascertained.

The inventors have found that a classifier based on a neural network may advantageously achieve a very high level of accuracy in ascertaining a closure point in time based on the time series of input signals.

Although the first values could be used to ascertain a closure point in time, this results in an inaccurate determination of the closure point in time, in particular if the distribution of the ascertained first values is multimodal. The example method therefore advantageously uses the plurality of second values for estimating the closure point in time. In particular, it is possible that for each first value, a second value exists that characterizes a probability that the point in time corresponding to the first value is a closure point in time, the second value being ascertained based on the first value and another first value neighboring the first value.

A second value may therefore be understood in such a way that it characterizes the probability that a point in time is a closure point in time, based on a plurality of probabilities around the particular point in time. In particular, the second value may therefore be understood as characterizing a probability mass.

The accuracy in determining a closure point in time may be improved by the ascertainment of a closure point in time based on a probability mass. In particular, possible inaccuracies or numerical outliers within the first values may thus be suppressed, which increases the accuracy of the determination.

In particular, it is possible that in the step of ascertaining the plurality of second values, a predefined first number of preceding first values of a first value, a predefined second number of subsequent first values of the first value, and the first value form the neighboring first values.

A sequence of the first value may be ascertained in particular based on the points in time of the time series that correspond to the first values. In particular, the first values may be sorted based on the points in time that correspond to them. Based on the sorting, a predecessor and a successor may then be ascertained for a first value. In particular, it is also possible, based on the sorting, to thus ascertain a neighborhood, i.e., a set of preceding and following first values of a first value.

For first values whose points in time with regard to the time series are situated in border areas, it is possible to use only following first values or only preceding first values as a neighborhood.

In one advantageous specific embodiment of the present invention, it is possible, in the step of ascertaining the plurality of second values, to ascertain in each case a second value with the aid of a one-dimensional discrete convolution.

This may be advantageous since specialized hardware and software exist for discrete convolutions, as the result of which the method may be speeded up. This is advantageous due to the fact that the method for ascertaining the closure time of the injector is generally repeated with a high level of frequency, and the most time-efficient design possible of the method may thus be made possible.

In addition, it is possible that in the step of ascertaining the closure point in time, a point in time that corresponds to the largest second value is ascertained as the closure point in time.

In a further preferred specific embodiment of the present invention, it is possible for the internal combustion engine to be controlled based on the ascertained closure point in time.

The internal combustion engine may be controlled very precisely due to the accurate ascertainment of the closure point in time. Fuel consumption of the internal combustion engine, efficiency of the internal combustion engine, pollutant emissions of the internal combustion engine, and/or running smoothness of the internal combustion engine may be advantageously improved in this way.

In one preferred specific embodiment of the method, it is possible for the method to additionally include a training of the classifier, the classifier being trained in such a way that for a time series of input signals of an injector it ascertains whether or not a particular point in time of the time series characterizes a closure point in time of the injector.

In particular, the classifier may be trained with supervision; i.e., the classifier may be trained in such a way that an error between an output signal that is ascertained by the classifier and a desired output signal is minimized.

A training data set necessary for the training may preferably be ascertained on a test bench. In particular, via appropriate measurements within the test bench a discharge of fuel from the injector may be ascertained, and with regard to a time series an accurate closure point in time of the injector may thus be ascertained. The closure point in time thus ascertained may then be used as the desired closure point in time which the classifier is to predict for the time series.

Specific embodiments of the present invention are explained in greater detail below with reference to the figures.

DETAILED DESCRIPTION OF EXAMPLE EMBODIMENTS

Figure 1:
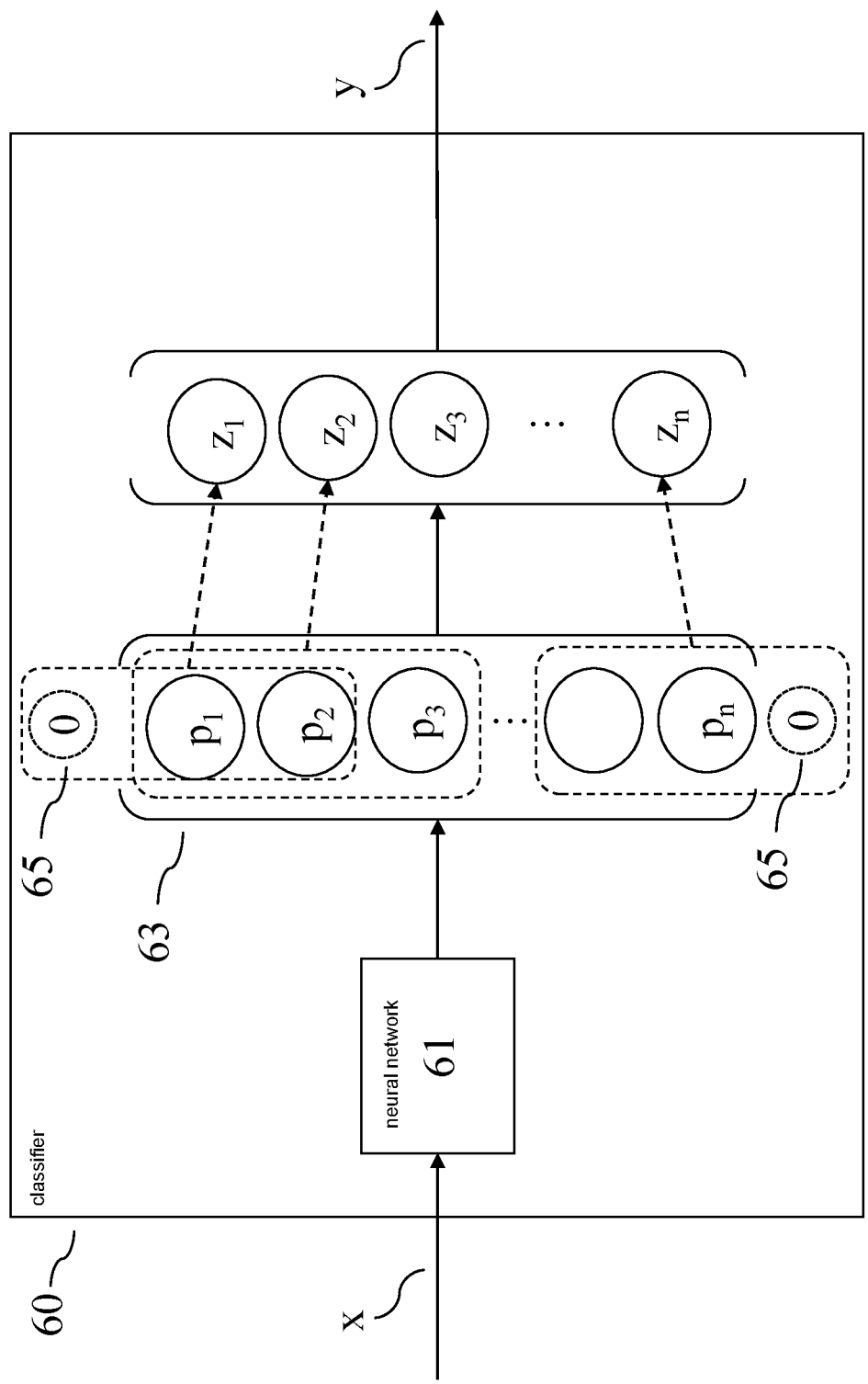
FIG. 1 schematically shows a classifier, in accordance with an example embodiment of the present invention.

FIG. 1 shows a classifier 60. In the exemplary embodiment, classifier 60 includes a neural network 61 for classifying a time series x of input signals. For each input signal, a point in time also exists. The point in time may be either an absolute point in time, for example the time of day or the number of elapsed seconds after a predefined point in time, or a relative point in time within the time series. In alternative exemplary embodiments, it is also possible to use some other machine learning model, for example a support vector machine, a random forest classifier, or a Gaussian process, for classifying the time series.

Neural network 61 ascertains a plurality of first values $p_1$, $p_2$, $p_3$, $p_n$ based on time series x, a first value $p_1$ $p_2$, $p^3$, $p_n$ being ascertained by neural network 61 for each input signal of time series x. A first value n $p_1$, $p_2$, $p_3$, $p_n$ in each case characterizes a probability that the point in time of the input signal corresponding to first value $p_1, p_2, p_3, p_n$ is a closure point in time of an injector. For this purpose, the neural network preferably outputs a vector 63 of first values $p_1, p_2, p_3, p_n$, first values $p_1, p_2, p_3, p_n$ being ascertained from an output layer of neural network 61. In the exemplary embodiment, the output layer uses a sigmoid function as an activation function. In alternative exemplary embodiments, it is also possible to use a softmax function as an activation function, or to use no activation function.

The arrangement of first values $p_1, p_2, p_3, p_n$ in vector 63 is preferably selected according to a sequence of first values $p_1, p_2, p_3, p_n$, the sequence being selected based on the points in time corresponding to first values $p_1, p_2, p_3, p_n$. For example, it is possible for an ascending index of the vector components to characterize a continuation of the points in time corresponding to first values $p_1, p_2, p_3, p_n$.

Vector 63 is supplied to a one-dimensional discrete convolution function which ascertains a plurality of second values $z_1, z_2, z_3, z_n$. Prior to the convolution, vector 63 is preferably filled ("padded") with zeroes 65 in such a way that the convolution ascertains as many second values $z_1, z_2, z_3, z_n$ as the number of first values $p_1, p_2, p_3, p_n$ that exist in vector 63. Alternatively, however, it is also possible for the convolution to take into account only first values $p_1, p_2, p_3, p_n$ that are present in vector 63, and therefore fewer second values $z_1, z_2, z_3, Z_n$ to be ascertained than the number of first values $p_1, p_2, p_3, p_n$ that exist. In the exemplary embodiment, the convolution in each case includes three first values $p_1, p_2, p_3, p_n$.

A second value $z_1, z_2, z_3, z_n$ may be understood in such a way that it characterizes the sum of a neighborhood of first values $p_1, p_2, p_3, p_n$. In particular, a second value $z_1, z_2, z_3, z_n$ may be understood in such a way that, with regard to the plurality of first values $p_1, p_2, p_3, p_n$, it has a reference value to which it corresponds. The convolution is preferably based on an uneven number of first values $p_1, p_2, p_3, p_n$, a second value $z_1, z_2, z_3, z_n$ having first value $p_1, p_2, p_3, p_n$ as a reference value, which within the meaning of the sorting of first values $p_1, p_2, p_3, p_n$ is the middle element. The reference element may be understood in such a way that it defines a point in time that corresponds to second value $z_1, z_2, z_3, z_n$. In other words, the reference element determines the point in time within the time series with which second value $z_1, z_2, z_3, z_n$ correlates.

It is also possible for the convolution to be based on an even number of first values $p_1, p_2, p_3, p_n$. In this case, a second value $z_1, z_2, z_3, z_n$ may preferably have two reference values, namely, the two middle values within the meaning of the sorting of first values $p_1, p_2, p_3, p_n$. The point in time corresponding to second value $z_1, z_2, z_3, z_n$ may then, for example, be a point in time situated between the point in time of the first of the two reference values, and the point in time of the second of the reference values, preferably the point in time that forms the middle between both points in time.

Second values $z_1, z_2, z_3, z_n$ may then be provided in an output signal y. Alternatively or additionally, it is possible for a point in time to be provided in output signal y as an ascertained closure time, the point in time that corresponds to the largest of second values $z_1, z_2, z_3, z_n$ being assumed as the point in time.

Figure 2:
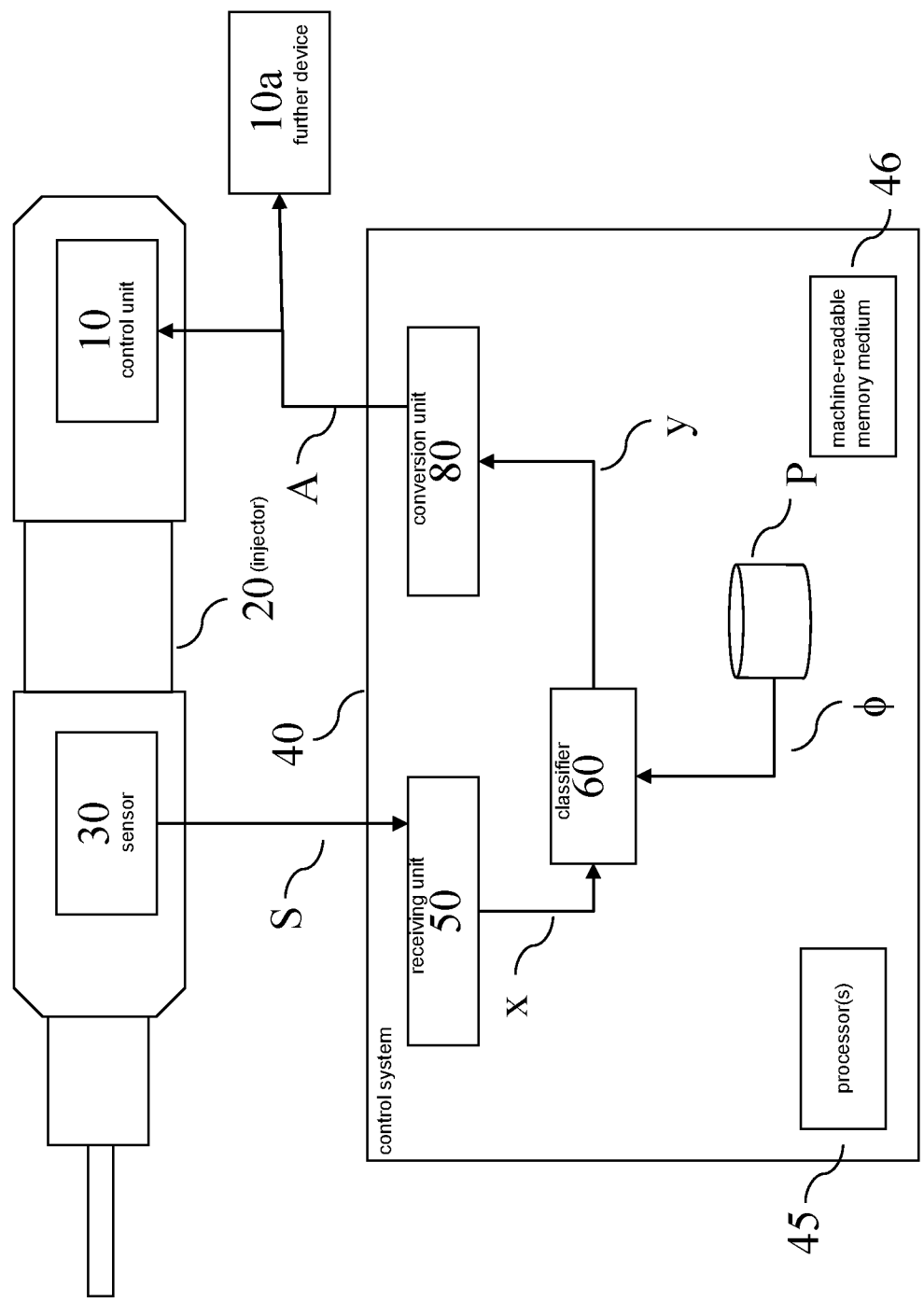
FIG. 2 schematically shows a design of a control system for activating an injector with the aid of the classifier, in accordance with an example embodiment of the present invention.

FIG. 2 shows a control system 40 for controlling an injector 20 of an internal combustion engine. A deformation of injector 20 is detected at preferably regular time intervals with the aid of a sensor 30. In the exemplary embodiment, sensor 30 is a piezo sensor. In alternative exemplary embodiments, other sensors 30 for ascertaining a deformation of the injector are also possible, for example sensors 30 based on a strain gauge.

A measurement S ascertained by sensor 30 is transferred to control system 40. Control system 40 thus receives a sequence of measurements S. Control system 40 ascertains activation signals A therefrom, which are transferred to a control unit 10 of injector 20.

Control system 40 receives the sequence of measurements S of sensor 30 in a receiving unit 50, which converts the sequence of measurements S into a time series x of input signals. The time series may be ascertained, for example, using a selection of past measurements and present measurement S. Alternatively, it is possible for the time series to include in each case a predefined number of past measurements and present measurement S. In other words, time series x is ascertained as a function of sensor signal S. Time series x of input signals is supplied to classifier 60.

Classifier 60 is preferably parameterized by parameters ϕ, which are stored in a parameter memory P and provided by same.

Based on time series x, classifier 60 ascertains an output signal y. Output signal y is supplied to an optional conversion unit 80, which ascertains therefrom activation signals A that are supplied to control unit 10 of injector 20 in order to appropriately activate control injector 20.

Control unit 10 receives activation signals A, is appropriately activated, and carries out a corresponding action. Control unit 10 may include a control logic system which is not necessarily structurally integrated, and which ascertains from activation signal A a second activation signal via which injector 20 is then activated.

In further specific embodiments of the present invention, control system 40 includes sensor 30. In yet further specific embodiments, control system 40 alternatively or additionally includes control unit 10 as well.

In further preferred specific embodiments of the present invention, control system 40 includes at least one processor 45, and at least one machine-readable memory medium 46 on which instructions are stored which, when executed on the at least one processor 45, prompt control system 40 to carry out the method according to the present invention.

In alternative specific embodiments of the present invention, as an alternative or in addition to control unit 10 it is provided that at least one further device 10a is activated with the aid of activation signal A. Device 10a may be, for example, a pump of a common rail system to which injector 20 belongs. Alternatively or additionally, it is possible for the device to be a control unit of the internal combustion engine. Alternatively or additionally, it is also possible for device 10a to be a display unit with the aid of which the information concerning the classification ascertained by classifier 60 may be appropriately displayed to a person, for example a driver or a mechanic.

Figure 3:
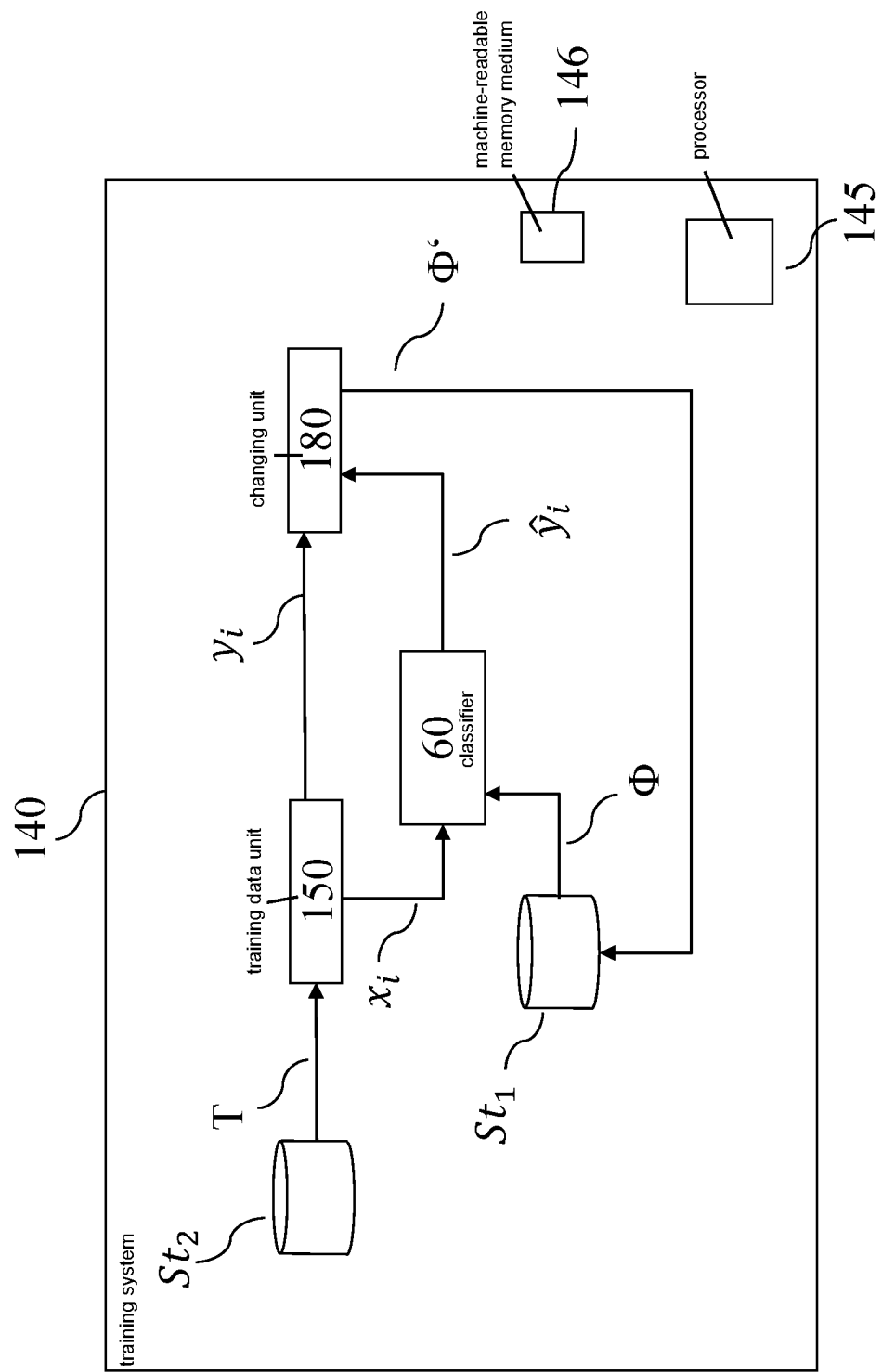
FIG. 3 schematically shows a training system for training the classifier, in accordance with an example embodiment of the present invention.

FIG. 3 shows one exemplary embodiment of a training system 140 for training classifier 60 of control system 40 with the aid of a training data set T. Training data set T includes a plurality of time series $x_i$ of input signals that are used for training classifier 60, training data set T also including for each time series $x_i$ a desired output signal $y_i$ that corresponds to time series $x_i$ and characterizes a classification of time series $x_i$.

For the training, a training data unit 150 accesses a computer-implemented database $St_2$, database $St_2$ providing training data set T. Training data unit 150 ascertains from training data set T, preferably randomly, at least one time series $x_i$ and desired output signal $y_i$ corresponding to time series $x_i$, and transfers time series $x_i$ to classifier 60. Classifier 60 ascertains an output signal $\hat{y}_i$ based on input signal $x_i$.

Desired output signal $y_i$ and ascertained output signal $\hat{y}_i$ are transferred to a changing unit 180.

Based on desired output signal $y_i$ and ascertained output signal $\hat{y}_i$, changing unit 180 then determines new parameters $\Phi'$ for classifier 60. For this purpose, changing unit 180 compares desired output signal $y_i$ and ascertained output signal $\hat{y}_i$ with the aid of a loss function. The loss function ascertains a first loss value, which characterizes the extent of the deviation of ascertained output signal $\hat{y}_i$ from desired output signal $y_i$. In the exemplary embodiment, a negative log likelihood function is selected as a loss function. Other loss functions are also possible in alternative exemplary embodiments.

Changing unit 180 ascertains new parameters $\Phi'$ based on the first loss value. In the exemplary embodiment, this takes place with the aid of a gradient descent method, preferably stochastic gradient descent, Adam, or AdamW. In alternative exemplary embodiments, new parameters $\Phi'$ may also be ascertained with the aid of an evolutionary algorithm.

Ascertained new parameters $\Phi'$ are stored in a model parameter memory $St_1$. Ascertained new parameters $\Phi'$ are preferably provided as parameters $\Phi$ to classifier 60.

In further preferred exemplary embodiments, the described training is iteratively repeated for a predefined number of iteration steps, or is iteratively repeated until the first loss value falls below a predefined threshold value. Alternatively or additionally, it is also possible for the training to be ended when an average first loss value with regard to a test data set or validation data set falls below a predefined threshold value. In at least one of the iterations, new parameters $\Phi'$ determined in a previous iteration are used as parameters $\Phi$ of classifier 60.

Furthermore, training system 140 may include at least one processor 145, and at least one machine-readable memory medium 146 that contains commands which, when executed by processor 145, prompt training system 140 to carry out a training method according to one of the aspects of the present invention.

The term "computer" encompasses arbitrary devices for processing predefinable computation rules. These computation rules may be present in the form of software, or in the form of hardware, or also in a mixed form made up of software and hardware.

In general, a plurality may be understood to be indexed; i.e., a unique index is assigned to each element of the plurality, preferably by assigning consecutive integers to the elements contained in the plurality. When a plurality includes N elements, where N is the number of elements in the plurality, the integers from 1 to N are preferably assigned to the elements.

What is claimed is:

1. A computer-implemented method for ascertaining a closure point in time of an injector of an internal combustion engine with the aid of a classifier, the method comprising the following steps:
    ascertaining a time series of input signals, each of the input signals corresponding to a point in time within the time series, and each of the input signals characterizing a deformation of the injector;
    ascertaining a plurality of first values using the classifier based on the time series of input signals, each of the first values corresponding to a point in time of the time series, and each of the first values characterizing a probability that the closure point in time of the injector matches the point in time corresponding to the first value;
    ascertaining a plurality of second values, each second value of the second values being a sum of neighboring first values of a first value of the first values and the first value, the neighboring first values being ascertained based on the points in time corresponding to the first values, and the second value corresponding to the point in time to which the first value corresponds; and
    ascertaining the closure point in time based on a largest second value of the plurality of second values.

2. The method as recited in claim 1, wherein the input signals are ascertained using a piezo sensor.

3. The method as recited in claim 1, wherein the classifier includes a neural network using which the plurality of first values is ascertained.

4. The method as recited in claim 1, wherein in the ascertaining of the plurality of second values, each second value is ascertained using a one-dimensional discrete convolution.

5. The method as recited in claim 1, wherein in the ascertaining of the plurality of second values, a predefined first number of preceding first values of the first value, a predefined second number of subsequent first values of the first value, and the first value form the neighboring first values.

6. The method as recited in claim 1 wherein in the ascertaining of the closure point in time, a point in time that corresponds to the largest second value is ascertained as the closure point in time.

7. The method as recited in claim 1, wherein the internal combustion engine is activated based on the ascertained closure point in time.

8. The method as recited in claim 1, further comprising:
    training the classifier, the classifier being trained in such a way that for a time series of input signals of an injector, the classifier ascertains whether or not a particular point in time of the time series characterizes a closure point in time of the injector.

9. A control system configured to ascertain a closure point in time of an injector of an internal combustion engine with the aid of a classifier, the control system configured to:
    ascertain a time series of input signals, each of the input signals corresponding to a point in time within the time series, and each of the input signals characterizing a deformation of the injector;
    ascertain a plurality of first values using the classifier based on the time series of input signals, each of the first values corresponding to a point in time of the time series, and each of the first values characterizing a probability that the closure point in time of the injector matches the point in time corresponding to the first value;
    ascertain a plurality of second values, each second value of the second values being a sum of neighboring first values of a first value of the first values and the first value, the neighboring first values being ascertained based on the points in time corresponding to the first values, and the second value corresponding to the point in time to which the first value corresponds; and
    ascertain the closure point in time based on a largest second value of the plurality of second values.

10. A non-transitory machine-readable memory medium on which is stored a computer program for ascertaining a closure point in time of an injector of an internal combustion engine with the aid of a classifier, the computer program, when executed by a processor, causing the processor to perform the following steps:
- ascertaining a time series of input signals, each of the input signals corresponding to a point in time within the time series, and each of the input signals characterizing a deformation of the injector;
- ascertaining a plurality of first values using the classifier based on the time series of input signals, each of the first values corresponding to a point in time of the time series, and each of the first values characterizing a probability that the closure point in time of the injector matches the point in time corresponding to the first value;
- ascertaining a plurality of second values, each second value of the second values being a sum of neighboring first values of a first value of the first values and the first value, the neighboring first values being ascertained based on the points in time corresponding to the first values, and the second value corresponding to the point in time to which the first value corresponds; and
- ascertaining the closure point in time based on a largest second value of the plurality of second values.

* * * * *